(12) United States Patent
Price

(10) Patent No.: US 8,479,260 B2
(45) Date of Patent: Jul. 2, 2013

(54) MULTI-LEVEL SECURITY CONTROLS SYSTEM

(75) Inventor: Darrel J. Price, Edwardsville, IL (US)

(73) Assignee: The Boeing Company, Chicago, IL (US)

( * ) Notice: Subject to any disclaimer, the term of this patent is extended or adjusted under 35 U.S.C. 154(b) by 565 days.

(21) Appl. No.: 12/643,256

(22) Filed: Dec. 21, 2009

(65) Prior Publication Data

US 2011/0154438 A1    Jun. 23, 2011

(51) Int. Cl.
*H04L 29/06* (2006.01)

(52) U.S. Cl.
USPC .................................................. 726/3

(58) Field of Classification Search
USPC ............... 726/2, 3; 711/163; 713/189–193, 713/160, 168; 380/44, 278
See application file for complete search history.

(56) References Cited

U.S. PATENT DOCUMENTS

2007/0255942 A1    11/2007  Weller et al.
2010/0277201 A1*   11/2010  Wortman et al. ............... 326/38

FOREIGN PATENT DOCUMENTS

EP           1318645 A2       6/2003
WO        2009151854 A1      12/2009
WO     WO2009151854 A1 *    12/2009

OTHER PUBLICATIONS

McLean et al., "FPGA-based Single Chip Cryptographic Solution", Proceeding of the SDR 06 Technical Conference and Product Exposition, 2006, pp. 1-4.*

Diana et al. "Multilevel Security in tightly coupled military systems: Virtualization as a path to MLS", Military Embedded Systems 2007, pp. 3.*
EP Extended Search for application EP10188340 dated Feb. 21, 2011.
"Single-Chip Cryptography", XILINX, 1 page, retrieved Nov. 2, 2009 http://www.xilinx.com/esp/aero_def/crypto.htm.
McLean et al., "FPGA-Based Single Chip Cryotographic Solution (U)", pp. 1-4, Proceeding of the SDR 06 technical Cofnerence and Product Exposition, 2006.
Quintana, "ESC-443: Fail-Safe FPGA Design Features for high-Reliability Systems", Apr. 2009, Altera Corporation, pp. 1-17.

* cited by examiner

*Primary Examiner* — Brandon Hoffman
*Assistant Examiner* — Hee Song
(74) *Attorney, Agent, or Firm* — Yee & Associates, P.C.

(57) ABSTRACT

A method and apparatus for processing information. First information is received from a first number of devices at a first number of interfaces configured to receive the first information in a first section of a programmable integrated circuit. The first information is sent to a second section in the programmable integrated circuit. Second information is received at a second number of interfaces in the second section from a second number of devices that generates the second information with a plurality of security levels. The first and second sections are partitioned from each other such that communication between the first and second sections is controlled by the second section. The first and second information are processed to form processed information that is sent to a number of network interfaces in which an identification of a security level within a plurality of security levels is associated with the processed information.

23 Claims, 5 Drawing Sheets

MULTI-LEVEL SECURITY CONTROLS SYSTEM

BACKGROUND INFORMATION

1. Field

The present disclosure relates generally to aircraft and, in particular, to processing information in an aircraft. Still more particularly, the present disclosure relates to a method and apparatus for processing information in an aircraft in which the information has different security levels.

2. Background

Platforms, such as aircraft, have different systems that provide the functionality of the aircraft. For example, with fighter aircraft, this type of platform has a number of different systems. These systems include, for example, controls, displays, weapons, communications, navigation, radar, and other suitable systems.

With older aircraft, such as the F-15 Eagle and the F/A-18 Hornet, information is handled at a single security level. The information in these systems may be handled at a secret security level. As a result, all personnel handling the aircraft who may have access to this information have the security clearance needed.

With newer aircraft and aircraft currently being designed, the different systems in the aircraft have a capability to process information at multiple security levels. Multiple security levels may be used to reduce the requirements for personnel handling different portions of the aircraft. For example, it may be desirable to have maintenance people with a lower security clearance level than currently present for aircraft that only have a single level of security. In this manner, costs for maintenance personnel may be decreased. Further, availability of maintenance personnel for maintaining platforms also may be increased.

With multiple levels of security in systems in an aircraft, persons with a higher security level are able to access the different systems with that security level or lower in aircraft. A person with a lower security level is able to access only those systems or portions of systems for which the person has clearance.

With respect to processing information, this separation of information and the handling of information is referred to as Multiple Levels of Security (MLS). A number of challenges is present in maintaining separation of information for different levels of security. Systems that are designed with Multiple Levels of Security may be evaluated using Fail Safe Design Assurance (FSDA) specifications from the National Security Agency (NSA). Under this specification, systems need to pass or are certified using formal mathematical methods and simulations to meet the desired specifications.

In designing systems that handle information with different levels of security, a number of techniques have been used. For example, one technique provides the user only the privileges needed for a particular function. As a result, if improper access is gained to one part of the system, access to other parts of the system are not provided. Further, other techniques include breaking the system up into smaller components. Also, in designing these systems, the ability to access one system should not allow access to other systems. Further, with system settings, the system should fail in a more secure level rather than a less secure level. As a result, information having a lower designation requires a decision of an appropriate authority or person to reduce the level of security of the information.

With the different requirements to design and implement systems that handle information with multiple levels of security, time and expense is needed to develop these systems. Further, many times these systems are larger in size, weight, and expense than desired when used in aircraft.

Therefore, it would be advantageous to have a method and apparatus that takes into account one or more of the issues discussed above, as well as possibly other issues.

SUMMARY

In one illustrative embodiment, an apparatus comprises a programmable integrated circuit, a first section, and a second section. The first section and the second section are in the programmable integrated circuit. The first section has a first number of interfaces configured to receive first information from a first number of devices. The second section has a second number of interfaces and a number of network interfaces. The second number of interfaces is configured to receive second information from a second number of devices that generate the second information with a plurality of security levels. The first section and the second section are partitioned from each other such that communication between the first section and the second section is controlled by the second section. The second section is configured to receive the first information from the first section. The second section is configured to process the first information and the second information to form processed information. The second section is also configured to send the processed information to the number of network interfaces. An identification of a security level within a plurality of security levels is associated with the processed information.

In another illustrative embodiment, a method is present for processing information. First information is received from a first number of devices at a first number of interfaces in a first section of a programmable integrated circuit. The first section has a first number of interfaces configured to receive the first information from the first number of devices. The first information is sent from the first section to a second section in the programmable integrated circuit. Second information is received at a second number of interfaces in the second section from a second number of devices that generate the second information with a plurality of security levels. The first section and the second section are partitioned from each other such that communication between the first section and the second section is controlled by the second section. The first information and the second information are processed to form processed information. The processed information is sent to a number of network interfaces in which an identification of a security level within a plurality of security levels is associated with the processed information.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives, and advantages thereof, will best be understood by reference to the following detailed description of an illustrative embodiment of the present disclosure when read in conjunction with the accompanying drawings, wherein:

DETAILED DESCRIPTION

Figure 1:
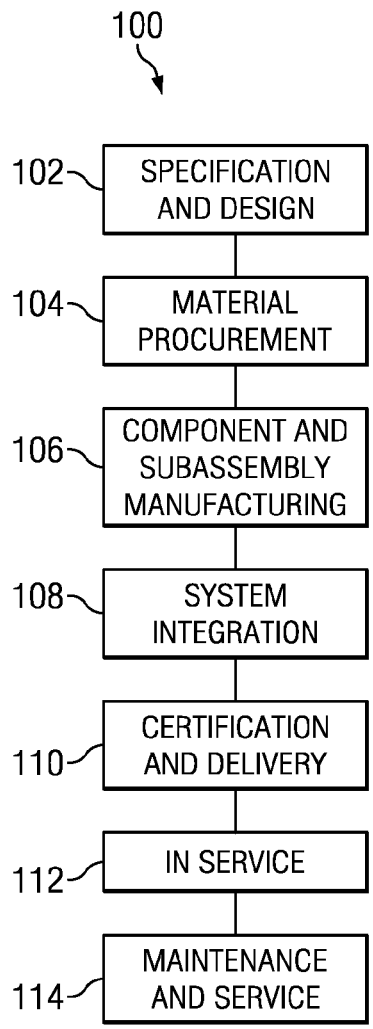
FIG. 1 is an illustration of an aircraft manufacturing and service method in accordance with an illustrative embodiment.
Figure 2:
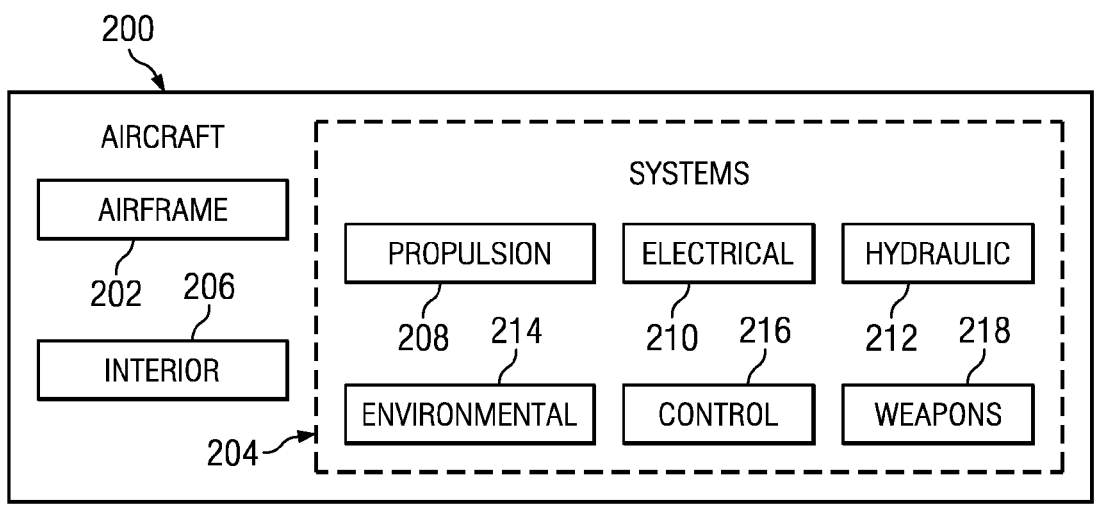
FIG. 2 is an illustration of an aircraft in which an illustrative embodiment may be implemented.

Referring more particularly to the drawings, embodiments of the disclosure may be described in the context of aircraft manufacturing and service method 100 as shown in FIG. 1 and aircraft 200 as shown in FIG. 2. Turning first to FIG. 1, an illustration of an aircraft manufacturing and service method is depicted in accordance with an illustrative embodiment. During pre-production, aircraft manufacturing and service method 100 may include specification and design 102 of aircraft 200 in FIG. 2 and material procurement 104.

During production, component and subassembly manufacturing 106 and system integration 108 of aircraft 200 in FIG. 2 takes place. Thereafter, aircraft 200 in FIG. 2 may go through certification and delivery 110 in order to be placed in service 112. Certification and delivery 110 may include evaluations using Failsafe Design Assurance (FSDA) and Common Criteria specifications. While in service 112 by a customer, aircraft 200 in FIG. 2 is scheduled for routine maintenance and service 114, which may include modification, reconfiguration, refurbishment, and other maintenance or service.

Each of the processes of aircraft manufacturing and service method 100 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of venders, subcontractors, and suppliers; and an operator may be an airline, leasing company, military entity, service organization, and so on.

With reference now to FIG. 2, an illustration of an aircraft is depicted in which an illustrative embodiment may be implemented. In this example, aircraft 200 is produced by aircraft manufacturing and service method 100 in FIG. 1 and may include airframe 202 with a plurality of systems 204 and interior 206. Examples of systems 204 include one or more of propulsion system 208, electrical system 210, hydraulic system 212, environmental system 214, control system 216, and weapons system 218. Any number of other systems may be included. Although an aerospace example is shown, different illustrative embodiments may be applied to other industries, such as the automotive industry.

Apparatus and methods embodied herein may be employed during at least one of the stages of aircraft manufacturing and service method 100 in FIG. 1. As used herein, the phrase "at least one of", when used with a list of items, means that different combinations of one or more of the listed items may be used and only one of each item in the list may be needed. For example, "at least one of item A, item B, and item C" may include, for example, without limitation, item A or item A and item B. This example also may include item A, item B, and item C or item B and item C.

In one illustrative example, components or subassemblies produced in component and subassembly manufacturing 106 in FIG. 1 may be fabricated or manufactured in a manner similar to components or subassemblies produced while aircraft 200 is in service 112 in FIG. 1.

As yet another example, a number of apparatus embodiments, method embodiments, or a combination thereof may be utilized during production stages, such as component and subassembly manufacturing 106 and system integration 108 in FIG. 1. A number, when referring to items, means one or more items. For example, a number of apparatus embodiments is one or more apparatus embodiments. A number of apparatus embodiments, method embodiments, or a combination thereof may be utilized while aircraft 200 is in service 112 and/or during maintenance and service 114 in FIG. 1. The use of a number of the different illustrative embodiments may substantially expedite the assembly of and/or reduce the cost of aircraft 200.

The different illustrative embodiments recognize and take into account a number of different considerations. For example, the different illustrative embodiments recognize and take into account that with respect to handling information on aircraft, space and weight is a concern. It is desirable to have the lowest amount of space and weight for components in an effort to reduce the overall weight of the aircraft.

The different illustrative embodiments also recognize and take into account that it is desirable to upgrade aircraft that currently only handle information at one level of security to handle information at multiple levels of security. These systems are computers that are designed for the aircraft. As a result, additional space for new components to handle multiple levels of security may be low or non-existent in currently used aircraft.

The different illustrative embodiments also recognize and take into account that information collected from controls, such as push buttons, hands on throttle and stick, keyboards, touch screen buttons, and other similar controls, may have different levels of security. The different illustrative embodiments recognize and take into account that this information should be transmitted to the computer system or processing unit with a label identifying the security level of the information. This processing should meet standards required for assuring that the information is handled appropriately within the computer system on the aircraft.

The different illustrative embodiments recognize and take into account that the current techniques for handling information from control systems can be more easily accomplished in command and controlled environments in which size, weight, and/or power restrictions are not present. The different illustrative embodiments recognize and take into account that currently, with tactical aircraft, this type of handling of information is feasible.

Thus, the different illustrative embodiments provide a method and apparatus for a multi-level security system that handles information from different components for an aircraft. These components include controls in the aircraft. In one illustrative embodiment, an apparatus comprises a programmable integrated circuit. A first section and a second section are present in the programmable integrated circuit. The first section has a first number of interfaces configured to receive first information from a first number of devices. The second section has a second number of interfaces and a number of network interfaces.

The second number of interfaces is configured to receive second information from a second number of devices. The second number of devices generates the second information with a plurality of security levels. The first section and the second section are partitioned from each other such that communication between the first section and the second section is controlled by the second section. The second section is configured to receive the first information from the first section, process the first information and the second information to form processed information, and send the processed information through the number of network interfaces in which an identification of the security level within the plurality of security levels is associated with the processed information.

Figure 3:
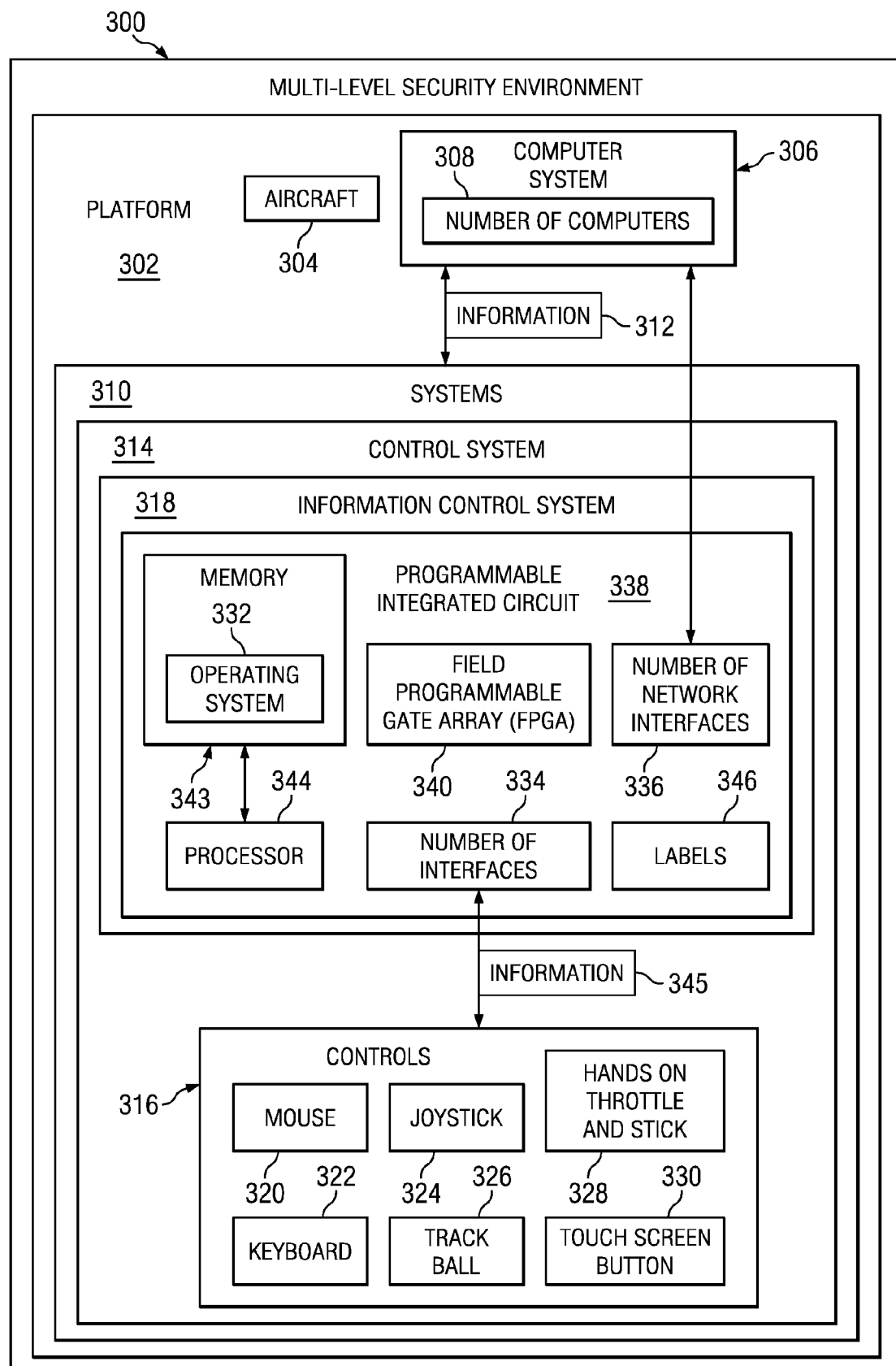
FIG. 3 is an illustration of a multi-level security environment in accordance with an illustrative embodiment.

With reference now to FIG. 3, an illustration of a multi-level security environment is depicted in accordance with an illustrative embodiment. Multi-level security environment 300, in this illustrative example, comprises platform 302. Platform 302 may take the form of aircraft 304. Aircraft 304 may be implemented using aircraft 200 in FIG. 2.

In this illustrative example, aircraft 304 includes computer system 306. Computer system 306 may comprise number of computers 308. When number of computers 308 includes two or more computers, each computer may be in communication with another computer within computer system 306. Number of computers 308 may be connected to each other through a network or some other communications fabric.

Computer system 306 may be in communication with systems 310. Computer system 306 may exchange information 312 with systems 310 in aircraft 304.

Information 312 may take a number of different forms. For example, without limitation, information 312 may be data, logs, program code, commands, images, and other suitable types of information.

In this illustrative example, systems 310 include control system 314. As illustrated, control system 314 includes controls 316 and information control system 318. Controls 316 may take a number of different forms. For example, without limitation, controls 316 may include mouse 320, keyboard 322, joystick 324, track ball 326, hands on throttle and stick 328, touch screen button 330, and other suitable types of controls.

Information control system 318 includes operating system 332, number of interfaces 334, and number of network interfaces 336. Number of interfaces 334 is configured to be connected to controls 316. Number of interfaces 334 may be, for example, without limitation, a serial input/output interface, an analog input/output interface, a universal serial bus interface, and/or other suitable types of interfaces. Number of network interfaces 336 is configured to be connected to computer system 306. Number of network interfaces 336, in these examples, may be a number of Ethernet interfaces.

In these illustrative examples, information control system 318 takes the form of programmable integrated circuit 338. In particular, field programmable gate array (FPGA) 340 may be used for programmable integrated circuit 338.

In these illustrative examples, operating system 332 is integrated within programmable integrated circuit 338. Operating system 332 may be stored on memory 343 and run by processor 344. In these examples, operating system 332 may be considered firmware. Of course, other processes may be stored on memory 343, depending on the particular implementation. Processor 344 is an embedded processor in these examples. In this manner, a higher assurance of the manner in which information 312 is handled by information control system 318 may be increased as compared to running code that is loaded from a storage device.

In these illustrative examples, control system 314 receives information 345 from controls 316. Information control system 318 associates labels 346 with information 345. Information 345 is then sent to computer system 306 for processing.

In this manner, a higher level of assurance in the handling of information 345 may be achieved using information control system 318 within control system 314. Further, by placing this functionality within programmable integrated circuit 338, the size and expense of information control system 318 may be reduced. For example, without limitation, when information control system 318 takes the form of field programmable gate array 340, information control system 318 may be associated with a computer in number of computers 308.

The illustration of multi-level security environment 300 in FIG. 3 is not meant to imply physical or architectural limitations to the manner in which different features may be implemented. Other components in addition to and/or in place of the ones illustrated may be used. Some components may be unnecessary in some illustrative embodiments. Also, the blocks are presented to illustrate some functional components. One or more of these blocks may be combined and/or divided into different blocks when implemented in different illustrative embodiments.

For example, systems 310 also may include other systems other than control system 314. For example, without limitation, systems 310 may include at least one of a navigation system, an electrical system, a hydraulic system, a weapons system, an environmental system, a propulsion system, and other suitable types of systems.

As another example, in other illustrative embodiments, platform 302 may take other forms. For example, without limitation, platform 302 may be a mobile platform, a stationary platform, a land-based structure, an aquatic-based structure, a space-based structure, and/or some other suitable object. More specifically, the different illustrative embodiments may be applied to, for example, without limitation, a submarine, a bus, a personnel carrier, a tank, a train, an automobile, a spacecraft, a space station, a satellite, a surface ship, a power plant, a dam, a manufacturing facility, a building, and/or some other suitable object.

As another example, in some illustrative embodiments, additional control systems may be used in addition to control system 314. These control systems may be used to manage information from other systems within systems 310 in addition to or in place of control system 314.

Figure 4:
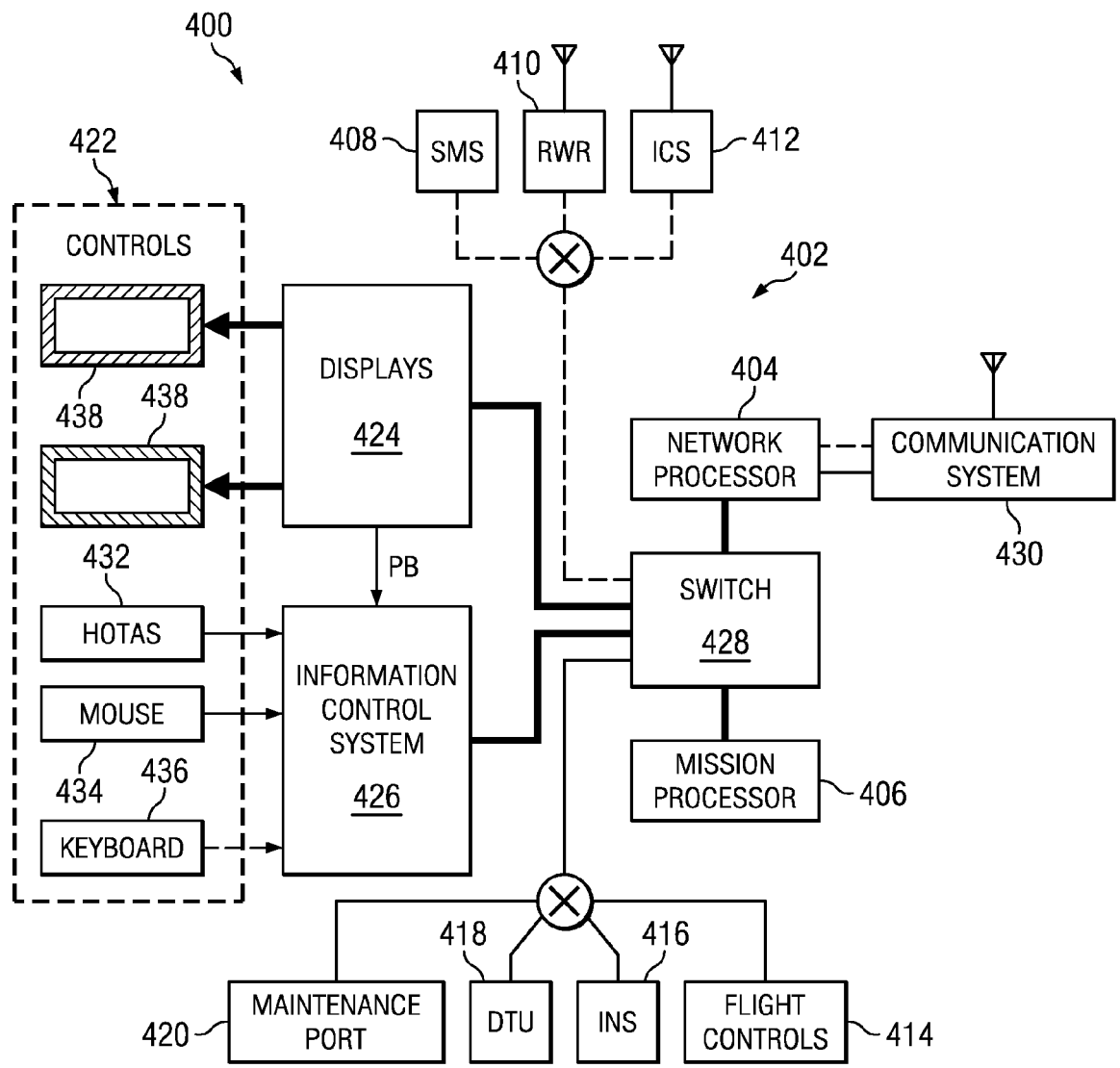
FIG. 4 is an illustration of a multi-level security environment in accordance with an illustrative embodiment.

With reference now to FIG. 4, an illustration of a multi-level security environment is depicted in accordance with an illustrative embodiment. Multi-level security environment 400 is an example of one implementation for multi-level security environment 300 in FIG. 3. In this illustrative example, multi-level security environment 400 may be implemented using aircraft 200 in FIG. 2. As illustrated, multi-level security environment 400 comprises network 402. In this illustrative example, network processor 404 and mission processor 406 are examples of computers in number of computers 308 in FIG. 3.

As illustrated, network 402 also includes storage management system (SMS) 408, radar warning receiver (RWR) 410, internal countermeasures system (ICS) 412, flight controls 414, inertial navigation system (INS) 416, data transfer unit (DTU) 418, maintenance port 420, controls 422, and displays 424. These components are examples of components that may be present within systems 310 in FIG. 3. Information control system 426, switch 428, and communication system 430 are also present in network 402.

Storage management system 408 tracks weapons on an aircraft. Further, this system may communicate with weapons and perform control functions. Storage management system 408 functions as an interface between mission processor 406 and the weapons on the aircraft.

Internal countermeasures system 412 includes a processor and a number of electronic emitters. Internal countermeasures system 412 jams hostile emitters in these illustrative examples.

Data transfer unit 418 is a storage device. Data transfer unit 418 may be a removable hard drive. Data transfer unit 418 loads mission parameters onto network 402.

Inertial navigation system 416 provides information about the position and attitude of the aircraft. Of course, other components, such as a global positioning system or other suitable navigation devices, may be present or used in addition to or in place of inertial navigation system 416.

Maintenance port 420 provides an interface to connect another data processing system to network 402. This port may be used to obtain information, such as vehicle health management data. In these examples, this interface may be an Ethernet port.

Switch 428 routes information between the different components within network 402 in these examples. Communications system 430 provides a wireless communications link to transfer information between network 402 and other locations remote to the aircraft.

In these illustrative examples, controls 422 comprise hand on throttle and stick (HOTAS) 432, mouse 434, and keyboard 436. Additionally, controls 422 also may include buttons 438 on displays 424. Buttons 438, in these examples, may be touch screen buttons or physical buttons associated with displays 424. Displays 424 provide a presentation of information to the crew of the aircraft.

As depicted, multi-level security environment 400 handles two levels of security. The higher level is secret, and the lower level is unclassified. Higher information handled in multi-level security environment 400 falls under one of these two levels. In other illustrative embodiments, multi-level security environment 400 may handle other numbers of levels of security. For example, multi-level security environment 400 may handle four levels of security, six levels of security, or some other suitable number of levels of security. Further, the levels of security may be levels other than secret and/or unclassified.

In these illustrative examples, storage management system 408, radar warning receiver 410, and internal countermeasures system 412 only handle secret information. Flight controls 414, inertial navigation system 416, data transfer unit 418, and maintenance port 420 are designed to only handle unclassified information. Displays 424 handle both secret and unclassified information. Information control system 426 handles both secret and unclassified information in these examples. Hands on throttle and stick 432 and mouse 434 only generate unclassified information. Keyboard 436 may generate both secret and unclassified information.

Network processor 404, mission processor 406, switch 428, and communication system 430 handle both secret and unclassified information in these examples.

Mission processor 406 may perform functions for the mission. For example, mission processor 406 may identify targets, calculate flight paths, and perform other suitable tasks for the mission. Network processor 404 handles information received from different components. Network processor 404 handles information for transmission by communication system 430. Additionally, network processor 404 also receives and routes information received through communication system 430. For example, network processor 404 handles the routing of the information from multi-level security environment 400 to another data processing system or computer system in another location.

The illustration of multi-level security environment 400 is an example of one implementation for multi-level security environment 300 in FIG. 3 and is not meant to imply physical or architectural limitations to the manner in which other multi-level security environments may be implemented. Other components in addition to and/or in place of the ones illustrated may be used. Some components may be unnecessary in some illustrative embodiments. Also, the blocks are presented to illustrate some functional components. One or more of these blocks may be combined and/or divided into different blocks when implemented in different illustrative embodiments.

For example, in other illustrative embodiments, network processor 404 may be omitted from network 402. In some illustrative embodiments, additional navigation devices in addition to inertial navigation system 416 may be present. For example, a global positioning system unit or other navigation devices may be used in addition to or in place of inertial navigation system 416.

As yet another example, information control system 426 is shown in a separate block to illustrate its function. In some illustrative examples, information control system 426 may be located on the same board or chip as mission processor 406. In still other illustrative examples, information control system 426 may be implemented as part of switch 428.

Figure 5:
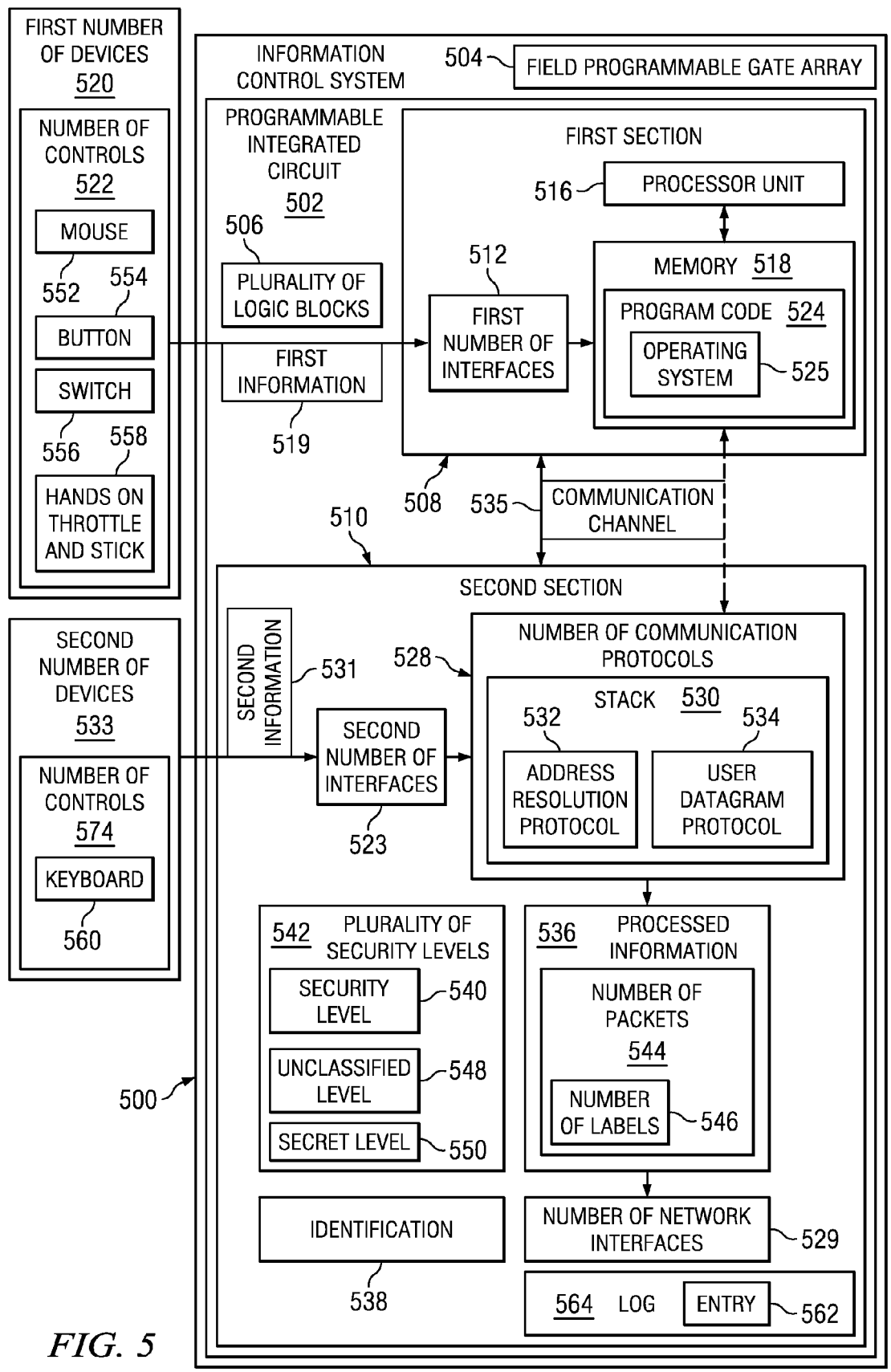
FIG. 5 is an illustration of an information control system in accordance with an illustrative embodiment.

Turning now to FIG. 5, an illustration of an information control system is depicted in accordance with an illustrative embodiment. In this illustrative example, information control system 500 is an example of one implementation for information control system 318 in FIG. 3 and information control system 426 in FIG. 4.

As depicted, information control system 500 has programmable integrated circuit 502. Programmable integrated circuit 502 is a circuit system consisting of semiconductor devices. Programmable integrated circuit 502 may be formed on a semiconductor substrate.

In this illustrative example, programmable integrated circuit 502 may be implemented using field programmable gate array 504. Field programmable gate array 504 is an integrated circuit that is designed to be configured after manufacturing. Field programmable gate array 504, in this illustrative example, has plurality of logic blocks 506. These logic blocks may be reconfigured and/or interconnected to form various functions.

In these illustrative examples, programmable integrated circuit 502 is partitioned into first section 508 and second section 510. The illustration of first section 508 and second section 510 does not depict the relative size of the sections to each other.

In the illustrative examples, first section 508 is much larger in size than second section 510. For example, first section 508 may use about 50 times more space on programmable integrated circuit 502 than second section 510. First section 508 may be used for other functions in addition to those provided in second section 510. For example, first section 508 may be used for routing information, processing sensor data, communications processing, and/or other suitable functions.

In this depicted example, first section 508 has first number of interfaces 512, processor unit 516, and memory 518. Processor unit 516 may be one or more embedded processors formed on programmable integrated circuit 502. Memory 518 may be, for example, a flash memory, a read only memory, or some other suitable type of memory. Only unclassified processing would occur in first section 508.

First number of interfaces 512 is configured to receive first information 519. First number of interfaces 512 is configured for connection to first number of devices 520. First number of interfaces 512 may be, for example, without limitation, at least one of an analog input/output interface, a serial input/output interface, a universal serial bus interface, or some other suitable type of interface for connection to first number of devices 520.

In these illustrative examples, number of controls 522 may be capable of generating first information 519 with an unclassified level of security. In these illustrative examples, number of controls 522 generates first information 519 with a single level of security. Number of controls 522 may be implemented using devices, such as, for example, mouse 552, button 554, switch 556, and hands on throttle and stick 558. In other illustrative examples, number of controls 522 may be implemented using a joystick, a touch screen button, and/or other suitable types of devices capable of generating signals in response to a user input or manipulation of the control.

First information 519 received from number of controls 522 at first number of interfaces 512 may be stored in memory 518. In this depicted example, first section 508 has program code 524. Program code 524 may be located in memory 518 and run by processor unit 516 in these examples. As depicted, program code 524 may comprise operating system 525. Operating system 525, in these illustrative examples, is used for processing first information 519 prior to sending first information 519 to second section 510.

First information 519 is sent to second section 510 through communication channel 535. Communication channel 535 is a physical connection between first section 508 and second section 510.

The partitioning of programmable integrated circuit 502 into first section 508 and second section 510 is performed such that exchange of information between first section 508 and second section 510 within programmable integrated circuit 502 is prevented except through communication channel 535. The flow of information between first section 508 and second section 510 is prevented using a subset of plurality of logic blocks 506. This subset of plurality of logic blocks 506 forms a partition between first section 508 and second section 510 in these examples. Communications channel 535 may be formed using a portion of plurality of logic blocks 506 such that communication between first section 508 and second section 510 only occurs using communications channel 535. This portion may be within of the subset of plurality of logic blocks 506. In these illustrative examples, communications channel 535 is controlled by second section 510.

In this depicted example, second section 510 has second number of interfaces 523, number of communication protocols 528, and number of network interfaces 529. Second number of interfaces 523 is configured to receive second information 531 from second number of devices 533. Second number of devices 533 may take the form of number of controls 574. Number of controls 574 is configured to generate second information 531 with different levels of security. Number of controls 574 may be implemented using keyboard 560 in this depicted example. In other illustrative examples, number of controls 574 may be implemented using a mouse, a button, a switch, a hands on throttle and stick, a joystick, a touch screen and/or some other suitable control.

In this illustrative example, number of communication protocols 528 is configured to process first information 519 and second information 531 received in second section 510. Number of communication protocols 528 may be implemented using a subset of plurality of logic blocks 506. In other words, number of communications protocols 528 may be in the form of hardware and may be an application specific integrated circuit (ASIC).

Number of communication protocols 528 forms stack 530. Stack 530 may be a portion of an Internet Protocol version IV stack. Number of communication protocols 528 may include, for example, without limitation, address resolution protocol 532, user datagram protocol (UDP) 534, and/or other suitable protocols. Address resolution protocol 532 identifies a link layer hardware address when only an Internet layer or network layer address is known. User datagram protocol 534 sends messages to other entities or devices on an Internet protocol network.

In these illustrative examples, number of communication protocols 528 processes first information 519 and second information 531 received in second section 510 to form processed information 536. Processed information 536 is associated with identification 538 of security level 540 within plurality of security levels 542.

In these depicted examples, plurality of security levels 542 may vary, depending on the particular implementation. For example, plurality of security levels 542 includes unclassified level 548 and secret level 550. In other illustrative embodiments, plurality of security levels 542 may include an unclassified level, a confidential level, a secret level, and a top secret level. Of course, any number of levels may be used, depending on the particular implementation.

Number of controls 522 generates first information 519 with a single level of security. In this example, first information 519 is unclassified level 548. Number of controls 574 generates second information 531 with multiple levels of security. In this illustrative example, second information 531 may be unclassified level 548 or secret level 550. For example, keyboard 560 may generate second information 531 with secret level 550.

In these illustrative examples, the level of security for second information 531 received from keyboard 560 may be set by the operator of keyboard 560. In these illustrative examples, the operator of keyboard 560 is assumed to have the authority and clearance to select the appropriate level of security. Keyboard 560 may generate second information 531 with a default of secret level 550 unless changed by the operator. The change may be made through an input button in keyboard 560, such as a particular function button, code, or other combination of input entered by the operator.

In these illustrative examples, user datagram protocol 534 forms processed information 536 by placing first information 519 and second information 531 into number of packets 544. Additionally, user datagram protocol 534 may place number of labels 546 into number of packets 544. Number of labels 546 corresponds to security levels within plurality of security levels 542. In this manner, processed information 536 is number of packets 544 with number of labels 546 corresponding to identification 538 of security level 540 within plurality of security levels 542 in these examples.

In this illustrative example, number of communication protocols 528 also may identify attempts to send first information 519 in the form of secret level 550 when that level is unauthorized. For example, first information 519 received from mouse 552, button 554, switch 556, and/or hands on throttle and stick 558 may only have unclassified level 548.

If an attempt is made to send first information 519 with secret level 550, number of communication protocols 528 creates entry 562 in log 564 to log the incident. In other words, attempts to send first information 519 with a security level other than the one selected for first section 508 results in the attempt being recorded in log 564. Entry 562 may include, for example, without limitation, first information 519, an identification of an operator, a time, a date, an identification of the device generating first information 519, and/or other suitable information.

In these illustrative examples, processed information 536 may be sent to a network using number of network interfaces 529.

The illustration of information control system 500 in FIG. 5 is not meant to imply physical or architectural limitations to the manner in which different illustrative embodiments may be implemented. Other components in addition to and/or in place of the ones illustrated may be used. Some components may be unnecessary in some illustrative embodiments. Also, the blocks are presented to illustrate some functional components. One or more of these blocks may be combined and/or divided into different blocks when implemented in different illustrative embodiments.

For example, in some illustrative embodiments, programmable integrated circuit 502 may be implemented using other types of integrated circuits other than field programmable gate array 504. For example, programmable integrated circuit 502 may be implemented as an application specific integrated circuit, using an embedded processor, a custom chip, or some other suitable form.

In yet other illustrative embodiments, additional sections, in addition to first section 508 and second section 510, may be present within programmable integrated circuit 502. In still other illustrative embodiments, programmable integrated circuit 502 may only have second section 510. Further, in still other illustrative embodiments, other processes may be included in addition to or in place of operating system 525. Also, in other illustrative embodiments, other numbers of levels of security may be used. For example, plurality of security levels 542 may be three levels, five levels, or some other suitable number of levels of security. Also, although first section 508 is illustrated as receiving information with a single level of security, first section 508 may be implemented to handle a number of security levels other than a single one as illustrated.

Figure 6:
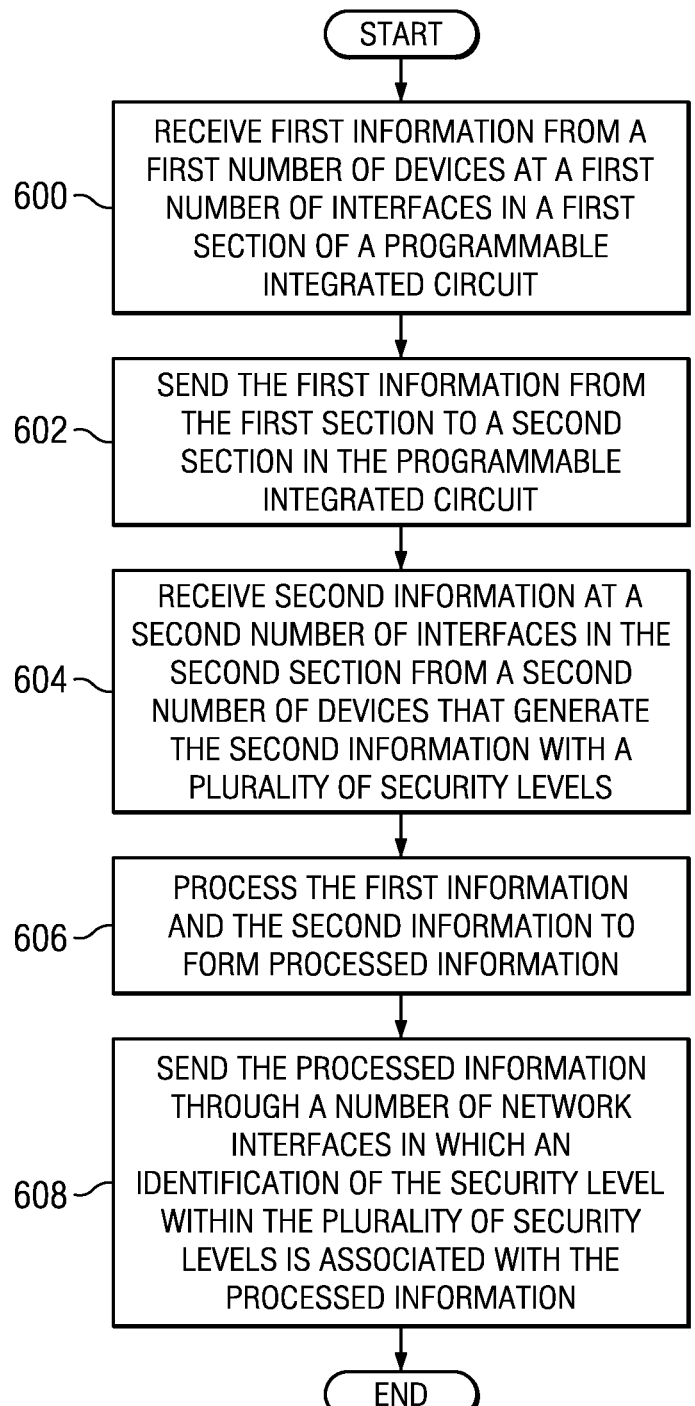
FIG. 6 is an illustration of a flowchart of a process for processing information in accordance with an illustrative embodiment.

With reference now to FIG. 6, an illustration of a flowchart of a process for processing information is depicted in accordance with an illustrative embodiment. The process illustrated in FIG. 6 may be implemented in a multi-level security environment, such as multi-level security environment 300 in FIG. 3. In particular, one or more of the illustrative embodiments may be used in control system 314 in FIG. 3.

The process begins by receiving first information from a first number of devices at a first number of interfaces in a first section of a programmable integrated circuit (operation 600). The first information is sent from the first section to a second section in the programmable integrated circuit (operation 602). The second section is partitioned from the first section such that communication between the first section and the second section is controlled by the second section. For example, the communication between the first section and the second section may be gate controlled by the second section.

Second information is then received at a second number of interfaces in the second section from a second number of devices that generate the second information with a plurality of security levels (operation 604). The first information and the second information are processed to form processed information (operation 606). This processing may include, for example, adding an identification of a security level within a plurality of security levels for the information. This processing also may include placing the information into a number of packets for transport onto a network. The identification of the security level may be a label or flag placed in the packet with the information.

The process then sends the processed information through a number of network interfaces in which an identification of the security level within the plurality of security levels is associated with the processed information (operation 608), with the process terminating thereafter.

Thus, the different illustrative embodiments provide a method and apparatus for handling information at multi-levels of security. In one illustrative embodiment, an apparatus comprises a programmable integrated circuit, a first section in the programmable integrated circuit, and a second section in the programmable integrated circuit. The first section has a first number of interfaces configured to receive first information from a first number of devices. The second section has a second number of interfaces and a number of network interfaces.

The second number of interfaces is configured to receive second information from a second number of devices. The second number of devices generates the second information with a plurality of security levels. The first section and the second section are partitioned from each other such that communication between the first section and the second section is controlled by the second section. The second section is configured to receive the first information from the first section, process the first information and the second information to form processed information, and send the processed information through the number of network interfaces in which an identification of security level within the plurality of security levels is associated with the processed information.

With these and other features in different illustrative embodiments, a capability to control information having different levels of security may be provided. The information control system in one or more of the different illustrative embodiments is configured to transfer information to and from a processor with a high level of degree of assurance that separation of information of different classification levels will be maintained. This high level of degree of assurance is one that may meet requirements from different specifications and entities. Further, the different illustrative embodiments may provide these and other features with a system that requires a small amount of area, as compared to other currently used systems.

The different illustrative embodiments can take the form of an entirely hardware embodiment, an entirely software embodiment, or an embodiment containing both hardware and software elements. Some embodiments are implemented in software, which includes, but is not limited to, forms, such as, for example, firmware, resident software, and microcode.

Furthermore, the different embodiments can take the form of a computer program product accessible from a computer-usable or computer-readable medium providing program code for use by or in connection with a computer or any device or system that executes instructions. For the purposes of this disclosure, a computer-usable or computer-readable medium can generally be any tangible apparatus that can contain, store, communicate, propagate, or transport the program for use by or in connection with the instruction execution system, apparatus, or device.

The computer-usable or computer-readable medium can be, for example, without limitation, an electronic, magnetic, optical, electromagnetic, infrared, or semiconductor system, or a propagation medium. Non-limiting examples of a computer-readable medium include a semiconductor or solid state memory, magnetic tape, a removable computer diskette, a random access memory (RAM), a read-only memory (ROM), a rigid magnetic disk, and an optical disk. Optical disks may include compact disk-read only memory (CD-ROM), compact disk-read/write (CD-R/W), and DVD.

Further, a computer-usable or computer-readable medium may contain or store a computer-readable or usable program code such that when the computer-readable or usable program code is executed on a computer, the execution of this computer-readable or usable program code causes the computer to transmit another computer-readable or usable program code over a communications link. This communications link may use a medium that is, for example, without limitation, physical or wireless.

A data processing system suitable for storing and/or executing computer-readable or computer-usable program code will include one or more processors coupled directly or indirectly to memory elements through a communications fabric, such as a system bus. The memory elements may include local memory employed during actual execution of the program code, bulk storage, and cache memories, which provide temporary storage of at least some computer-readable or computer-usable program code to reduce the number of times code may be retrieved from bulk storage during execution of the code.

Input/output or I/O devices can be coupled to the system either directly or through intervening I/O controllers. These devices may include, for example, without limitation, keyboards, touch screen displays, and pointing devices. Different communications adapters may also be coupled to the system to enable the data processing system to become coupled to other data processing systems, remote printers, or storage devices through intervening private or public networks. Non-limiting examples are modems and network adapters and are just a few of the currently available types of communications adapters.

The description of the different illustrative embodiments has been presented for purposes of illustration and description, and it is not intended to be exhaustive or limited to the embodiments in the form disclosed. Many modifications and variations will be apparent to those of ordinary skill in the art.

Although the different illustrative embodiments have been described with respect to aircraft, the different illustrative embodiments also recognize that some illustrative embodiments may be applied to other types of platforms in which information control is desired. For example, without limitation, other illustrative embodiments may be applied to a mobile platform, a stationary platform, a land-based structure, an aquatic-based structure, a space-based structure, and/or some other suitable object. More specifically, the different illustrative embodiments may be applied to, for example, without limitation, a submarine, a bus, a personnel carrier, a tank, a train, an automobile, a spacecraft, a space station, a satellite, a surface ship, a power plant, a dam, a manufacturing facility, a building, and/or some other suitable object.

Further, different illustrative embodiments may provide different advantages, as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An apparatus comprising:
    a programmable integrated circuit;
    a first section in the programmable integrated circuit, wherein the first section has a first number of interfaces configured to receive first information from a first number of devices that generate the first information with a first assigned security label, the first assigned security label being associated with a first security level selected from a plurality of security levels; and
    a second section in the programmable integrated circuit, wherein the second section has a second number of interfaces and a number of network interfaces; wherein the second number of interfaces is configured to receive second information from a second number of devices that generate the second information with a second assigned security label, the second assigned security label being associated with a second security level selected from the plurality of security levels; wherein the first section and the second section are partitioned from each other such that communication between the first section and the second section is controlled by the second section; wherein the second section is configured to receive the first information from the first section, process the first information and the second information to form processed information with a processed security label for a third security level that is within the plurality of security levels, and send the processed information to the number of network interfaces in which an identification of the processed security label is associated with the processed information.

2. The apparatus of claim 1, wherein the second section forms a number of packets with at least one of the first information and the second information and further comprising:
    a number of communications protocols, wherein the number of communications protocols adds a number of labels to the number of packets, wherein each label in the number of labels identifies the security level within the plurality of security levels.

3. The apparatus of claim 2, wherein the number of communications protocols is part of a stack.

4. The apparatus of claim 1, wherein the first section further comprises a processor and a memory.

5. The apparatus of claim 1, wherein the second section is configured to receive the identification of the security level for the second information from a device in the second number of devices.

6. The apparatus of claim 5, wherein the device is a keyboard.

7. The apparatus of claim 1, wherein the second section is configured to only accept the first information with a selected security level in the plurality of security levels and log attempts to send the first information to the second section with a different security level from the selected security level in the plurality of security levels.

8. The apparatus of claim 1, further comprising:
    logic blocks configured to partition the first section and the second section from each other; and
    a communications channel within the logic blocks, wherein the communications channel is controlled by the second section and the communication between the first section and the second section occurs only using the communications channel.

9. The apparatus of claim 1, wherein the first information has a single security level in the plurality of security levels and wherein the identification of the security level for the first information is identified based on the first information being received from the first section.

10. The apparatus of claim 1, wherein the plurality of security levels comprises an unclassified level and a secret level.

11. The apparatus of claim 1, wherein the programmable integrated circuit is a field programmable gate array.

12. The apparatus of claim 1, wherein the first number of devices and the second number of devices comprises at least one of a keyboard, a mouse, a joystick, a touch screen, hands on throttle and stick, and a switch.

13. The apparatus of claim 1 further comprising:
a switch, wherein the number of network interfaces is configured to connect to the switch.

14. The apparatus of claim 1, wherein the programmable integrated circuit is associated with a platform.

15. The apparatus of claim 14, wherein the platform is selected from a group consisting of a mobile platform, a stationary platform, a land-based structure, an aquatic-based structure, a space-based structure, an aircraft, a tactical fighter plane, a surface ship, a tank, a personnel carrier, a train, a spacecraft, a space station, a satellite, a submarine, an automobile, a power plant, a bridge, a dam, a manufacturing facility, and a building.

16. A method for processing information, the method comprising:
receiving first information from a first number of devices that generate the first information with a first assigned security label, the first assigned security label being associated with a first security level selected from a plurality of security levels, the first information being received at a first number of interfaces in a first section of a programmable integrated circuit, wherein the first section has the first number of interfaces configured to receive the first information from the first number of devices; and
sending the first information from the first section to a second section in the programmable integrated circuit;
receiving second information at a second number of interfaces in the second section from a second number of devices that generates the second information with a second assigned security label, the second assigned security label being associated with a second security level selected from the plurality of security levels, wherein the first section and the second section are partitioned from each other such that communication between the first section and the second section is controlled by the second section;
processing the first information and the second information to form processed information with a processed security label for a third security level that is within the plurality of security levels; and
sending the processed information to a number of network interfaces in which an identification of the processed security label is associated with the processed information.

17. The method of claim 16, wherein the step of processing the information received at the number of network interfaces to form the processed information comprises:
forming a number of packets from the first information and the second information; and
placing the identification of the processed security level within the plurality of security levels in each of the number of packets.

18. The method of claim 17, wherein the identification of the security level in the plurality of security levels is different between the first information and the second information.

19. The method of claim 16 further comprising:
receiving the identification of the security level in the plurality of security levels for the second information from a device in the second number of devices.

20. The method of claim 19, wherein the device is a keyboard.

21. The method of claim 16, wherein the steps of processing and sending are performed using a plurality of communications protocols in the second section.

22. The method of claim 16, wherein the first section further comprises a processor and a memory.

23. The method of claim 16, wherein the first section and the second section are partitioned from each other using logic blocks, a communications channel controlled by the second section is present in the logic blocks, and the communication between the first section and the second section occurs only using the communications channel.

* * * * *